United States Patent
Kinsora

(10) Patent No.: US 10,945,473 B2
(45) Date of Patent: Mar. 16, 2021

(54) SPECIALIZED STRAP ASSIST GLOVE AND RECEIVING TUBE FOR INDIVIDUALS WITH LIMITED HAND DEXTERITY

(71) Applicant: Michael Kinsora, Grayling, MI (US)

(72) Inventor: Michael Kinsora, Grayling, MI (US)

( * ) Notice: Subject to any disclaimer, the term of this patent is extended or adjusted under 35 U.S.C. 154(b) by 219 days.

(21) Appl. No.: 16/142,199

(22) Filed: Sep. 26, 2018

(65) Prior Publication Data

US 2019/0289933 A1    Sep. 26, 2019

Related U.S. Application Data

(60) Provisional application No. 62/648,017, filed on Mar. 26, 2018.

(51) Int. Cl.
| | |
|---|---|
| *A41D 19/00* | (2006.01) |
| *A01K 97/00* | (2006.01) |
| *A63B 71/00* | (2006.01) |
| *A63B 57/20* | (2015.01) |

(52) U.S. Cl.
CPC .......... *A41D 19/0024* (2013.01); *A01K 97/00* (2013.01); *A63B 57/20* (2015.10); *A63B 71/00* (2013.01); *A41D 2300/32* (2013.01); *A41D 2600/10* (2013.01); *A41D 2600/106* (2013.01)

(58) Field of Classification Search
CPC ....................... A41D 19/0024; A41D 2300/32; A63B 57/20; A63B 57/12; A63B 57/00; A63B 71/00; A01K 97/00
USPC ........... 473/212, 213, 276, 206, 205; 482/44
See application file for complete search history.

(56) References Cited

U.S. PATENT DOCUMENTS

| | | | |
|---|---|---|---|
| 5,333,605 A | | 8/1994 | Matsumura et al. |
| 5,414,868 A | * | 5/1995 | Crawford ............. A63B 71/146 2/160 |
| 5,493,782 A | | 2/1996 | Gulko |
| 6,350,206 B1 | * | 2/2002 | Lambert, II ........... A63B 53/14 473/205 |
| 7,128,656 B1 | * | 10/2006 | Orchel ................... A63B 53/14 473/205 |
| 7,211,004 B2 | * | 5/2007 | DeMarco .......... A41D 19/01552 2/161.2 |
| 8,070,619 B2 | | 12/2011 | Edwards |
| 8,157,664 B2 | * | 4/2012 | Duncan ..................... A61F 4/00 473/212 |
| 9,750,290 B2 | | 9/2017 | Carey et al. |

(Continued)

FOREIGN PATENT DOCUMENTS

| | | |
|---|---|---|
| DE | 2338930 A | 1/2000 |
| WO | 9944450 A1 | 9/1999 |

*Primary Examiner* — John E Simms, Jr.
*Assistant Examiner* — Rayshun K Peng
(74) *Attorney, Agent, or Firm* — Dinsmore & Shohl LLP

(57) ABSTRACT

A wearable assist device and receiving tube for providing grip assist to a wearer of limited hand and grip ability during manipulation of an elongated article. The device includes an attachable body having each of thumb, hand and wrist strap portions adapted to being secured to a hand of the user. The receiving tube engages to the body in manner which prevents the tube from sliding or rotating relative to the body. The elongated article includes and not limited to any of a golf club or fishing rod and is adapted to being resistively engaged within the tube in a manner which compensates for the limitations in the user's hand and grip ability during a motion induced manipulation of the article.

9 Claims, 11 Drawing Sheets

(56) References Cited

U.S. PATENT DOCUMENTS

2006/0186280 A1    8/2006    Thompson et al.
2010/0217168 A1    8/2010    King et al.

\* cited by examiner

SPECIALIZED STRAP ASSIST GLOVE AND RECEIVING TUBE FOR INDIVIDUALS WITH LIMITED HAND DEXTERITY

CROSS REFERENCE TO RELATED APPLICATIONS

The present application claims the priority of U.S. Ser. No. 62/648,017 filed Mar. 26, 2018, the contents of which are incorporated by reference.

FIELD OF THE INVENTION

The present invention discloses a wearable gripping assist device for use with individuals with limited hand dexterity, and which in particular is adapted to support an internally hollow sleeve or tube portion adapted in turn to receive any of a golf pole or fishing rod, so as to provide additional functionality, including grip, along with enhanced dexterity for the user.

BACKGROUND OF THE INVENTION

The prior art is documented with examples of hand grip splint or assist devices. A first example of this is the passive mechanical exoskeleton of Carey, U.S. Pat. No. 9,750,290 which teaches maintaining a static grip around an object via a tendon drive and ratchet mechanism. The ratchet mechanism combines a passive cable retract and ratchet system with one or more cables acting as artificial tendons. When a user wishes to keep their hand in a specific position around an object, the ratchet system is engaged. A cable retract mechanism keeps the artificial tendon taught at all times. The combination of these systems allows for the user to keep grip on objects without the need to input force over time thereby reducing fatigue.

King, US 2010/0217168 teaches a hand orthosis for assisting gripping by persons with a disability affecting hand function, and having a thumb part, a hand part which fits around a user's hand between the thumb and knuckles, and a forearm part which fits to a user's forearm above the hand. The orthosis includes a flexible connecting element connected at one end to the thumb part and which is movably coupled to the hand part and connected at another end to the forearm part such that when the orthosis is fitted to a user, extension of the user's wrist draws the user's thumb towards the user's index finger to form a grip. A powered embodiment of the orthosis is also disclosed.

A further example of a club grip assist device is depicted in Lambert, U.S. Pat. No. 6,350,206 which shows a lightweight, portable device to assist one-armed limited humans to simulate a two-handed golf grip that may have been lost due to a stroke, accident or illness. The device features an arm cuff attached to a golf club shaft tube which extends a sufficient length to encapsulate a majority portion of a golf club handle. At the opposite end of the shaft tube is an elastic retaining cord which fits over the wrist of the active arm thereby holding the device snugly to the arm, both at an area around the wrist and at an area around the upper forearm due to the arm cuff. A retaining leaf on the side of the shaft tube acts to help stabilize oscillation of the club handle yet permits easy movement of the club handle either for length of grip positioning or extraction/insertion of a golf club.

SUMMARY OF THE PRESENT INVENTION

The present invention discloses a wearable assist device and receiving tube for providing grip assist to a wearer of limited hand and grip ability during manipulation of an elongated article. The device includes an attachable body having each of thumb, hand and wrist strap portions adapted to being secured to a hand of the user. The receiving tube engages to the body in manner which prevents the tube from sliding or rotating relative to the body. The elongated article includes and not limited to any of a golf club or fishing rod and is adapted to being resistively engaged within the tube in a manner which compensates for the limitations in the user's hand and grip ability during a motion induced manipulation of the article.

Additional features include a strap extending from the tube and engaging at an opposite end the attachable body. The tube strap includes hook and loop portions at opposite ends thereof.

Other features include the receiving tube being encircled by the hand and wrist strap portions during engagement to the body. The body further includes a forward projection adapted to surrounding the wearer's thumb and for supporting ends of the thumb strap portion, with the body also being constructed of a suitable material not limited to a durable fabric. The tube may further include any rigid material not limited to a lightweight aluminum or PVC.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference now to FIGS. 1-12, the present invention discloses a wearable gripping assist device, such including a wearable fabric body supporting strap at 10, for use with individuals with limited hand dexterity. As will be further described, the strap and fabric body is adapted to support an internally hollow sleeve or tube portion, further at 12, which is adapted in turn to receive an inserting shaft end of any of a golf club or fishing rod/pole (further shown at 2 in each of FIGS. 1-4), so as to provide additional functionality, including grip, along with enhanced dexterity for the user.

Figure 1:
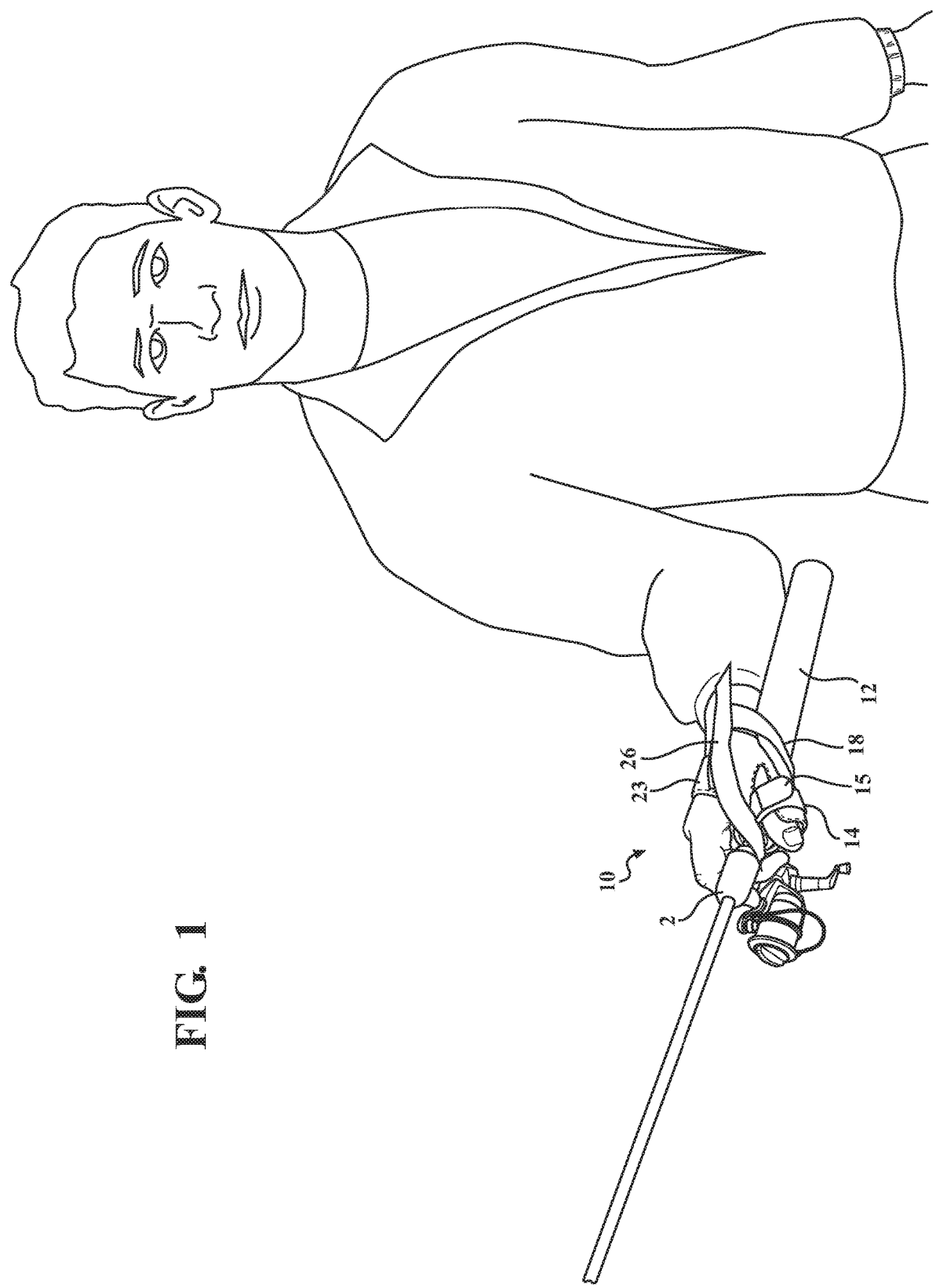
FIG. 1 is an environmental view of the grip assist device according to one non-limiting embodiment of the present invention.

As initially depicted in FIG. 1, shown is an environmental view of a grip assist device according to one non-limiting embodiment of the present invention and which can be used with object or article (not limited again to a club, fishing pole, or the like) in order to compensate for limitations regarding a level of compressive grip which may be exerted by the user on the club or shaft 2. Without limitation, such limitations or disabilities can be caused in whole or in part by any of degenerative muscle diseases, injuries or other conditions which may result in the user exerting only a partial or no effective live of compressive grip on rod, pole, or shaft, with the result being that a level of participation in the given pursuit (golfing, fishing, etc.,) is limited or precluded in its entirety. The present invention seeks to overcome the limitations to such individuals by combining the wearable assist device 10 with the separate and attachable tube, these working in combination to compensate for the lack of a compressive grip exerted by the user on the shaft or rod and in order to substitute a necessary and primary degree of grip and retention of the club, pole or rod, this in order to allow the individual to participate normally in the given sport or pursuit without being impeded by his/her physical limitation.

Figure 2:
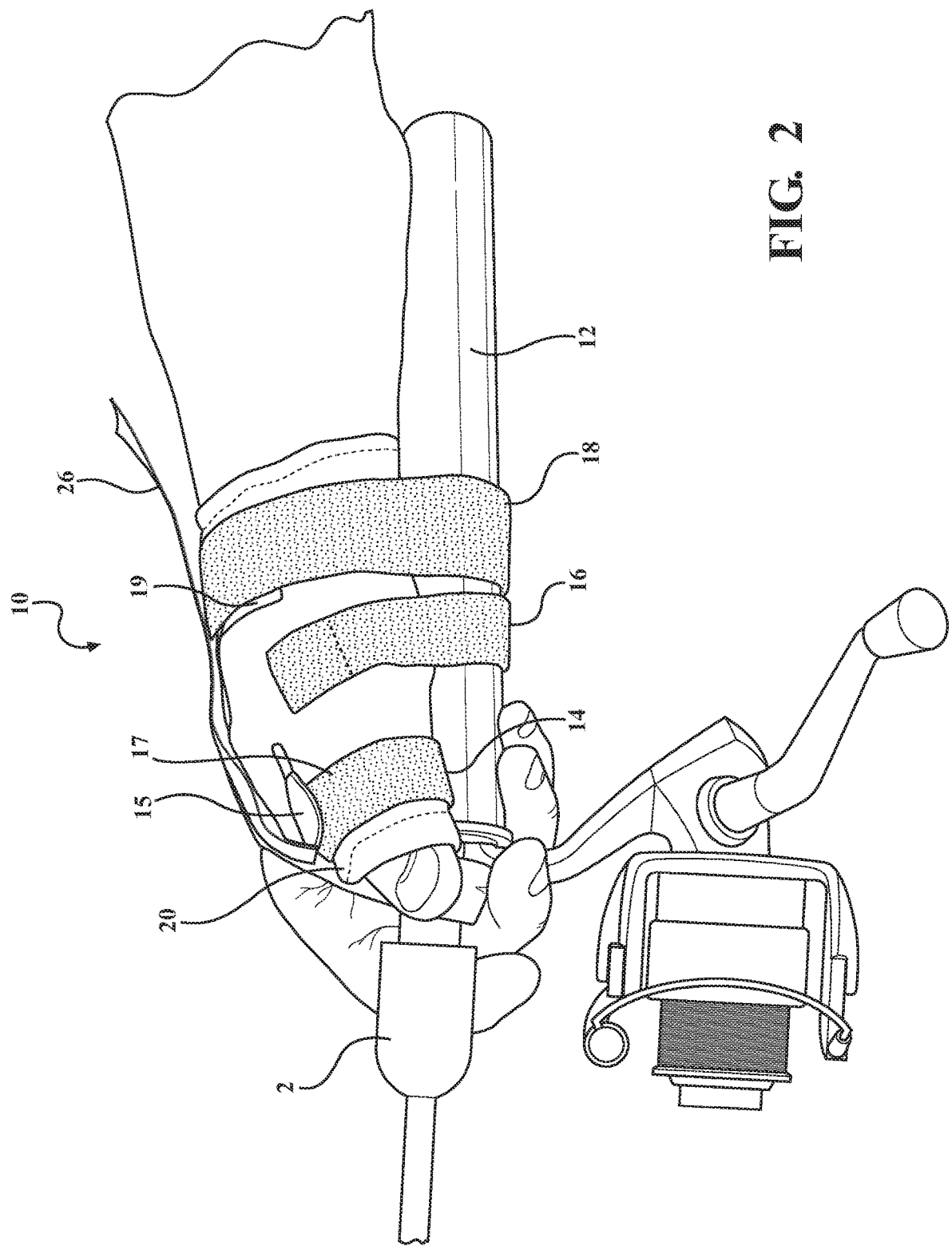
FIGS. 2-4 provide a further series of close up depictions of the grip assist device and including the provision of the wearable hand and wrist portion, with plural hook and loop (Velcro) attachment portions, this in combination with the elongated tube for receiving an inserting end of the accessory (golf club, fishing pole, etc.)
Figure 3:
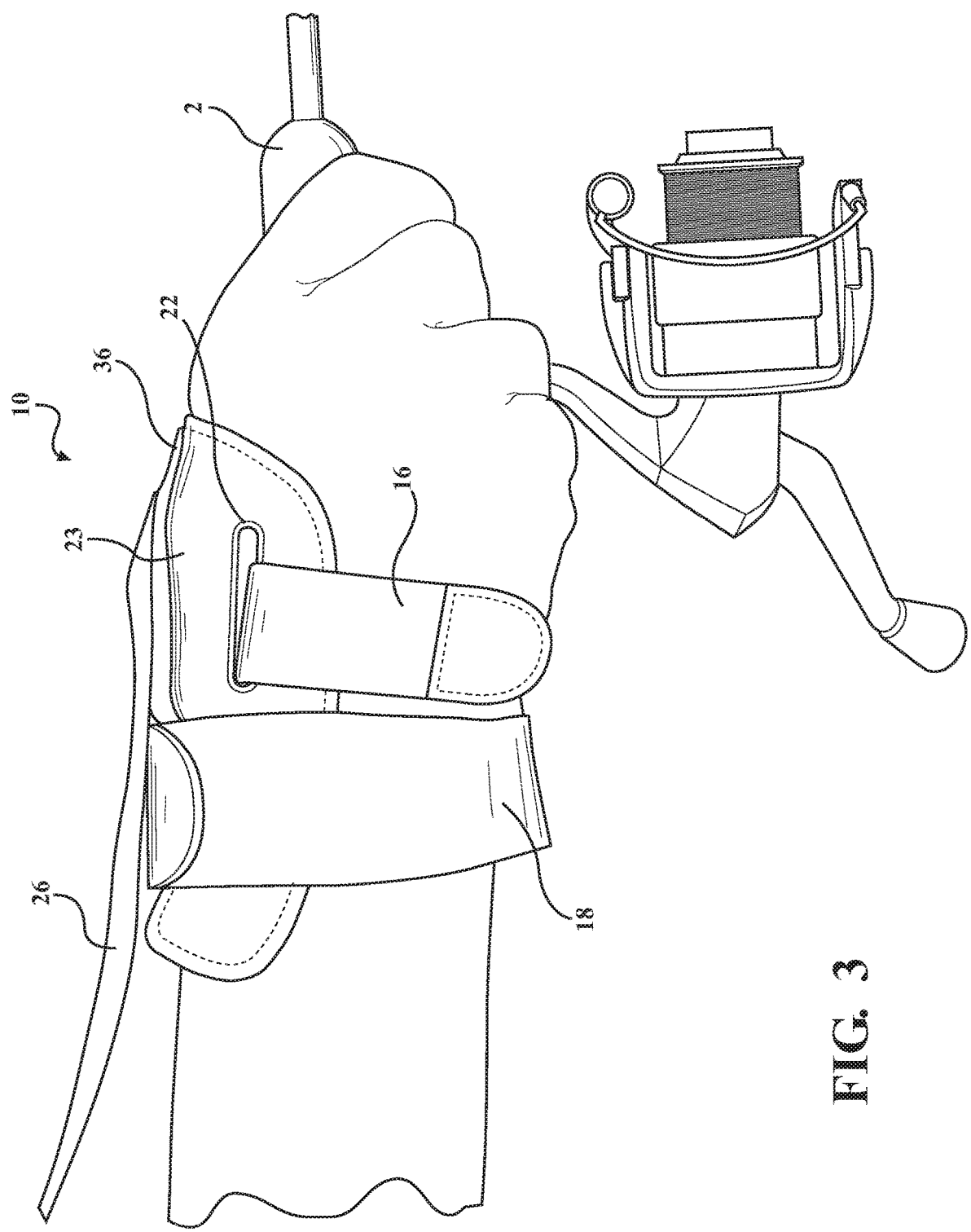
Figure 4:
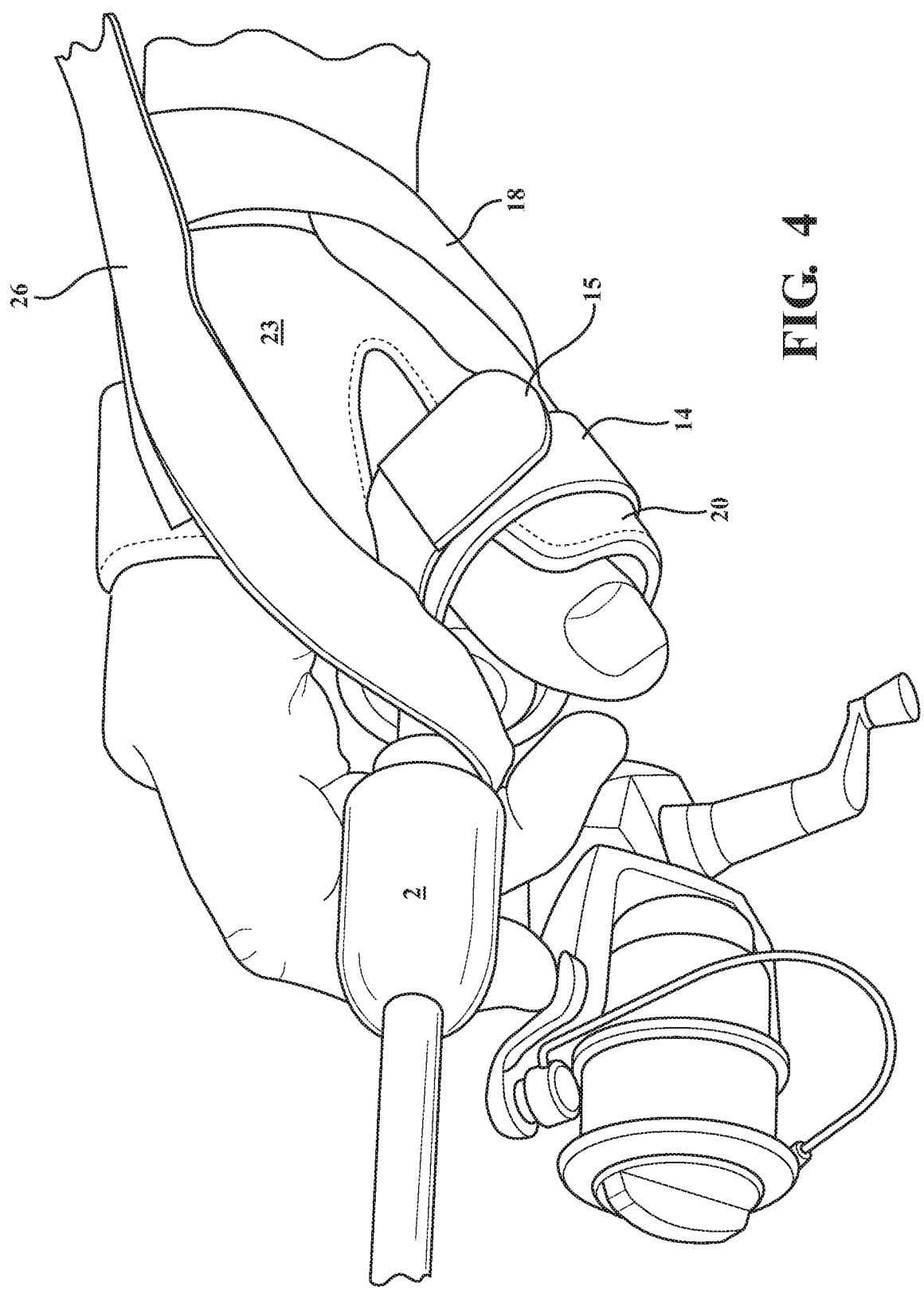

FIGS. 2-4 provide a further series of close up depictions of the wearable grip assist device 10 and including the provision of the wearable hand and wrist portion, such constructed of a contoured fabric bad having plural hook and loop (Velcro) attachment portions including each of a first thumb attachment strap 14 exhibiting opposing thumb attachment hook and loop portions (these configured on opposing meshing surfaces provided by the strap 14 with an opposing wrap around end portion 15 having opposing pluralities of hook and loop fasteners configured therebetween). As shown in the reverse facing view of FIG. 6, the thumb fabric body portion 20 supporting the wrap around portions 14/15 can also without limitation be configured so as to extend from a cutout location (see at 13) of the main fabric body 23. Alternatively, the thumb supporting fabric portion 20 can be stitched or otherwise secured to a solid fabric location of the main body 23. Also provided is an intermediate hand attachment strap 16 with opposing hook and loop portions (see as best shown at 17 in FIG. 6), along with a third and rearmost located wrist attachment strap 18 with a similar arrangement of opposing hook and loop portions, examples of which are further shown at 19.

Without limitations, the hook and loop strap and fasteners depicted can be provided as a single strap or a pair of opposing straps. In the present example the forward most thumb strap 14 extends from a forward most projection 20 (best shown in FIGS. 2 and 4) of the main wearable assist device which is further in the form of a main contoured and fabric body 23), each of the straps 14, 16 and 18 including opposing hook and loop (Velcro) or other inter-attachment portions. As best again understood, any or all of the thumb strap 14, hand strap 16 and wrist strap 18 can be reconfigured or substituted by a pair of individual straps secured to the main flexible fabric portion 23 which is contoured about the back of the wearer's hand and thumb. As further depicted in FIG. 3 by selected hand strap 16, the wearable grip assist device can include receiving channels or slots (see at 22) configured in the main contoured portion 23 and which assist in reception of the strap during installation onto the wearer's hand and prior to subsequent inserting installation of the article receiving tube 12.

Figure 5:
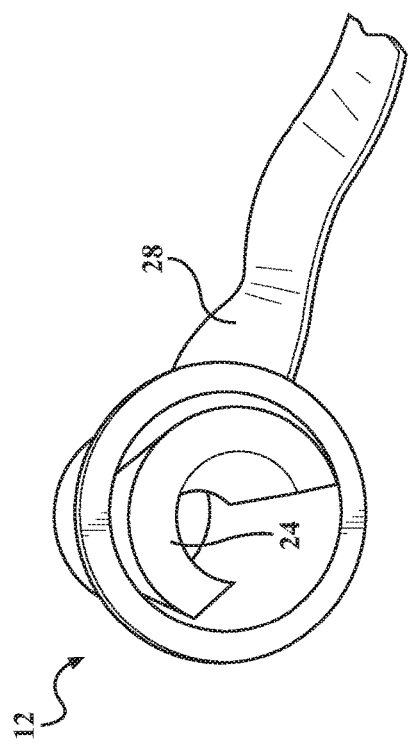
FIG. 5 is an end view of the receiving tube of FIGS. 1-4 and better illustrating a biasing insert such as which is adapted to better frictionally engage the inserted pole, club shaft or rod and to better compensate for any limitations in grip exerted by the user.

FIG. 5 is an end view of the receiving tube 12 of FIGS. 1-4 (such including but not limited to any of a lightweight aluminum or plastic or PVC material). FIG. 5 also better illustrates provision of any type of compressing, cushioning or biasing insert, see at 24, such as which is adapted to better frictionally engage the inserted pole, club shaft or rod (again at 2 in FIG. 1) and to better compensate for any limitations in grip exerted by the user. The insert 24 is shown as a semi-circular foam portion, it being understood that any suitable cushioning or compressing portion can be utilized for exerting a sufficient frictional grip on the portion of the shaft or club which is installed into the tube 12.

Figure 7:
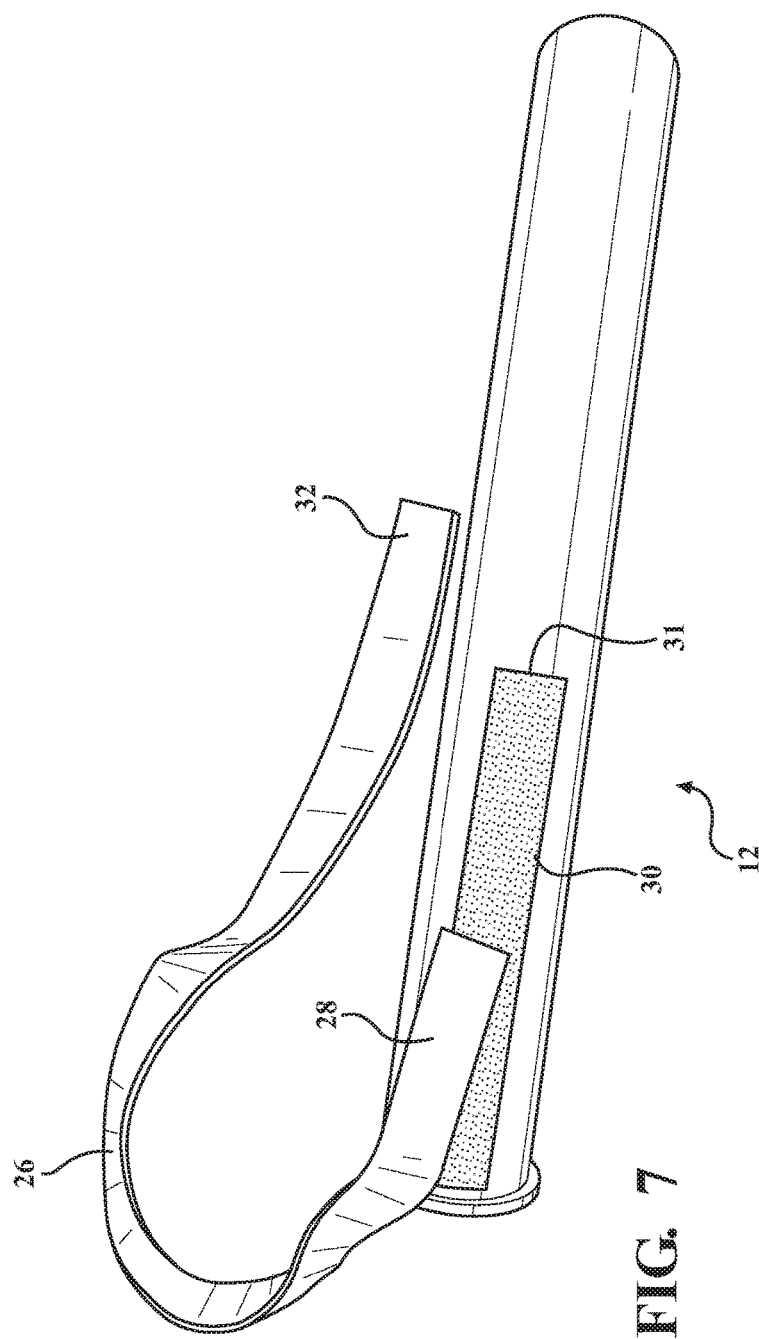
FIGS. 6 and 7 provide a pair of individual views of the wearable grip assist device and separated receiving tube with retention strap according to non-limiting embodiments of the present invention.
Figure 6:
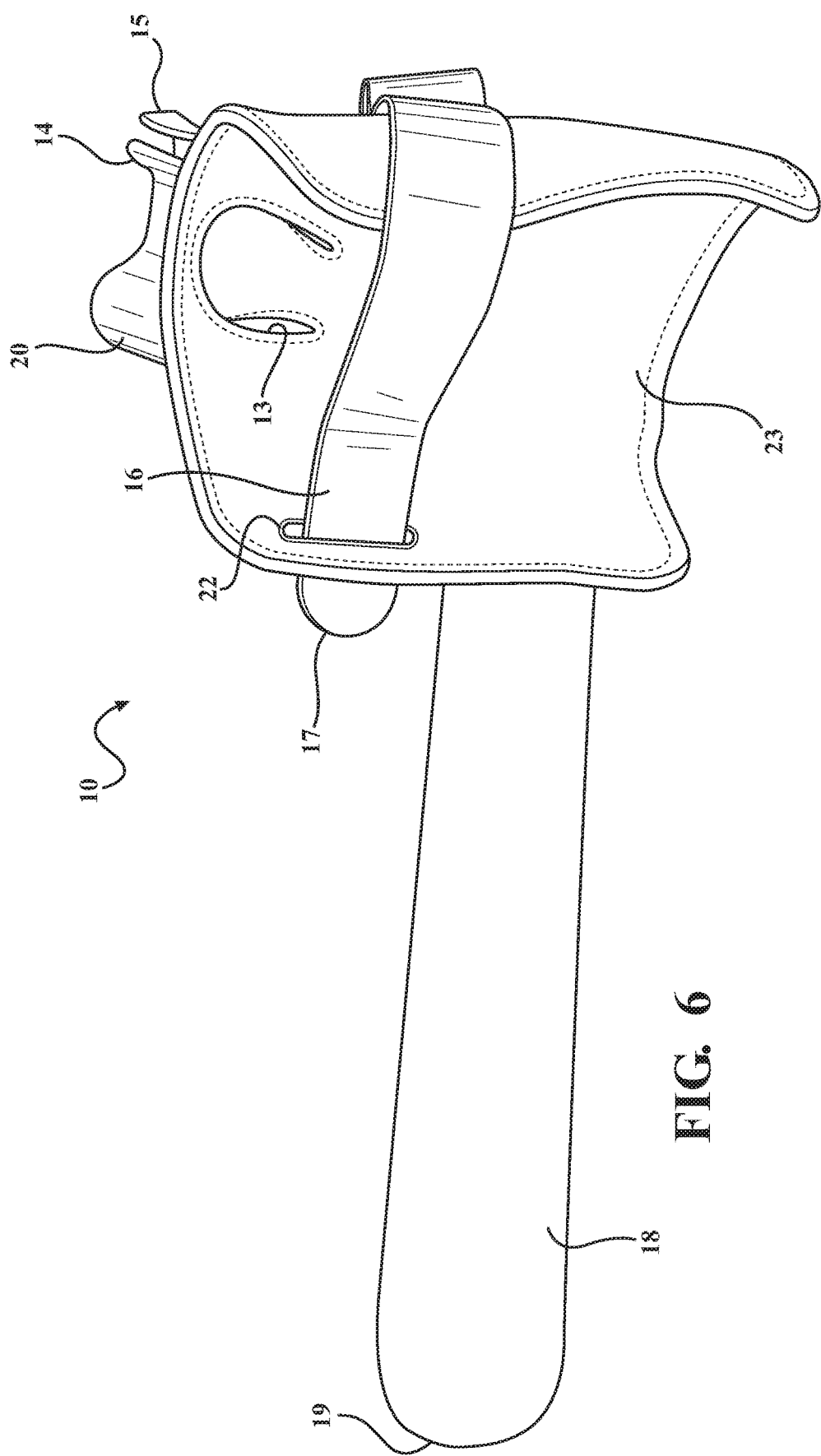
Figure 8:
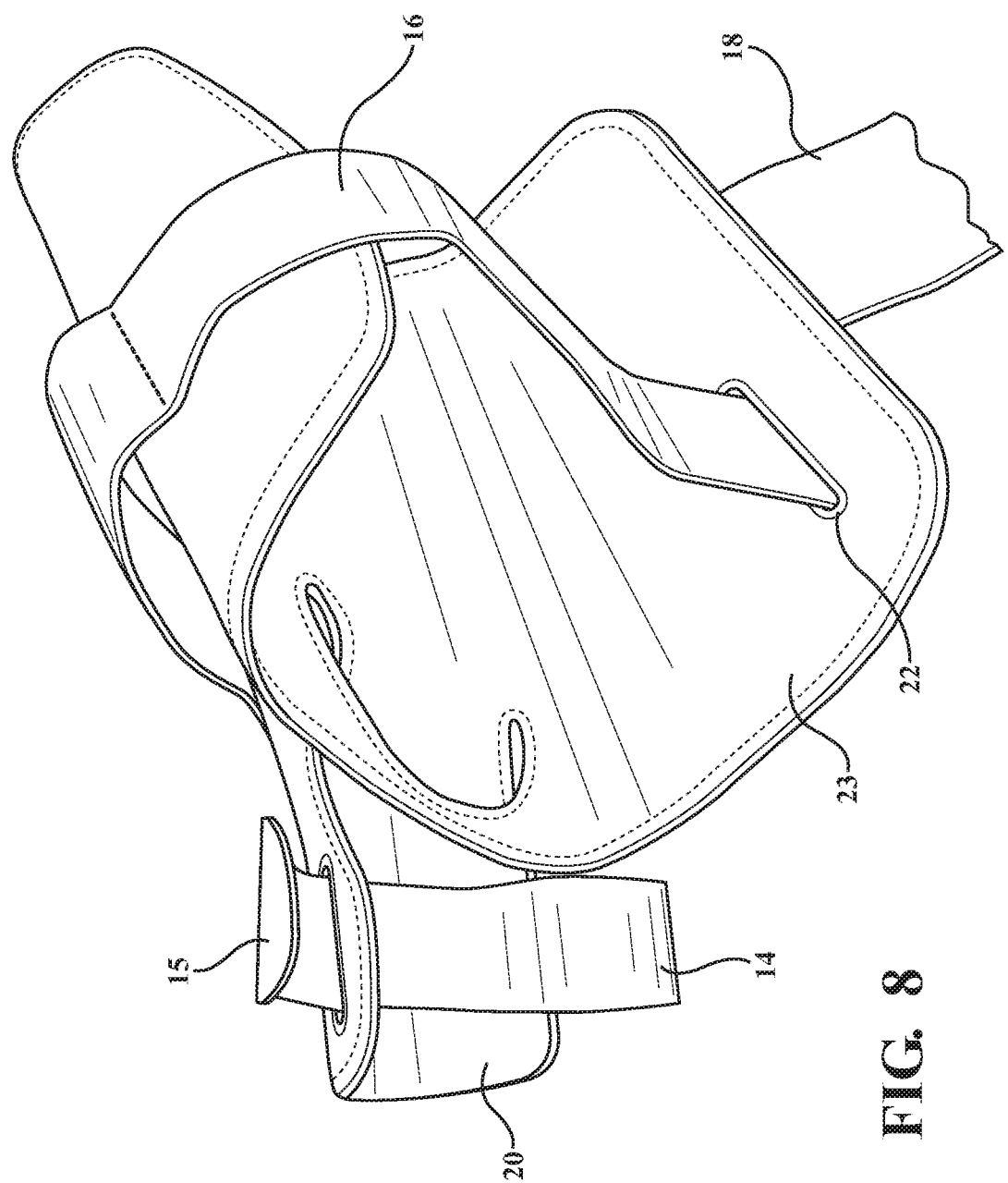
FIG. 8 is a further perspective view of the wearable assist device, such adapted for use with the right hand and wrist of the wearer, and illustrating similar to FIG. 3, a plurality of hook and loop attachments for each of the thumb, hand and wrist of the wearer.

FIGS. 6 and 8 provide a pair of individual views of the wearable grip assist device 10 separated from the receiving tube 12 of FIGS. 5 and 7, the latter further exhibiting a retention strap 26 according to one non-limiting embodiment of the present invention. As illustrated throughout the several views, the strap 26 is configured to engage at a first end 28 (see again FIG. 7) to the tube 12 so that hook and loop (Velcro) portions configured on a surface of the first extending end of the tube retention lanyard or strap 26 (underside of strap end 28 in FIG. 7 hidden from view) are engaged to additional hook and loop portions (see further at 30) which are supported upon a strip 31 attached to the exterior of the tube 12. As again best shown, the hook and loop portions 30 can be integrated into an adhesive attachment secured to the tube exterior 12.

The tube lanyard or strap 26 further includes a second remote extending end 32 which includes a further arrangement of hook and loop portions 34 (see also FIGS. 12-13) these being attached to a receiving plurality of hook and loop portions 36 which are integrated into a surface of the wearable hand attachment 10, such as extending along the back of the wearer's hand between the fore-finger and the wrist. As best shown in FIGS. 1-3, the construction of the tube 12 and strap 26 is such that, with the tube 12 secured underneath the hand 16 and wrist 18 straps (the wrist strap further including an overlapping end 19 shown in each FIG. 6) of the wearable device and in proximity to the underside of the wearer's hand, the rod or shaft (again at 2) is frictionally installed within the open end of the tube 12 in frictional contact with the compressible or biasing portion 24 supported within the tube. At this point, the tube strap 26 is wound forwardly around the base of the rod 2 (see again FIGS. 1-2) and then reversed rearwardly so that the extending end of the tube strap 32 engages the hook and loop portions 36 extending along the exterior of the wearable device and in proximity to the back of the user's hand.

Figure 9:
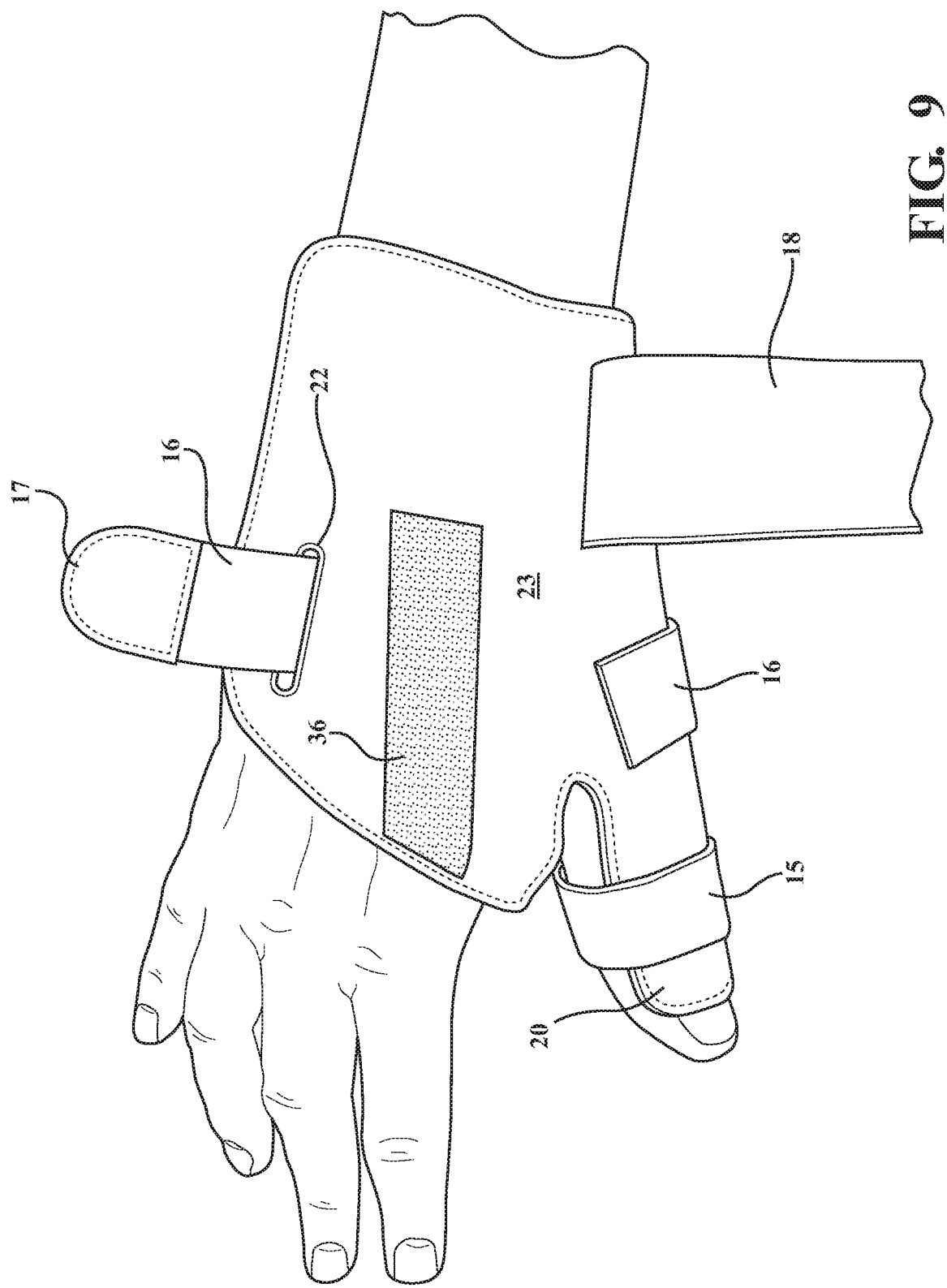
FIG. 9 is an initial installation view in which the wearable device is initially positioned in place with the thumb hook and loop portion engaged and the hand and wrist portions remaining loose prior to installation of the support tube.

FIGS. 6 and 9 further provide a pair of varying perspective views best depicting the contours of the wearable device 10 prior to being secured to the wearer's hand and wrist. This can include the overall configuration of the device, such again including the heavy fabric or like construction including the main body 23 with forward extending contoured thumb portion 20 which supports the thumb strap 14 and opposite wrap around end 15 between which are configured opposing pluralities of hook and loop fasteners (again shown at 17 in FIG. 2). FIGS. 6, 8 and 9 also best show the contour of the main body 23 of the attachable device 10 and such as which is optimized for wrapping about the user's hand and wrist.

Figure 10:
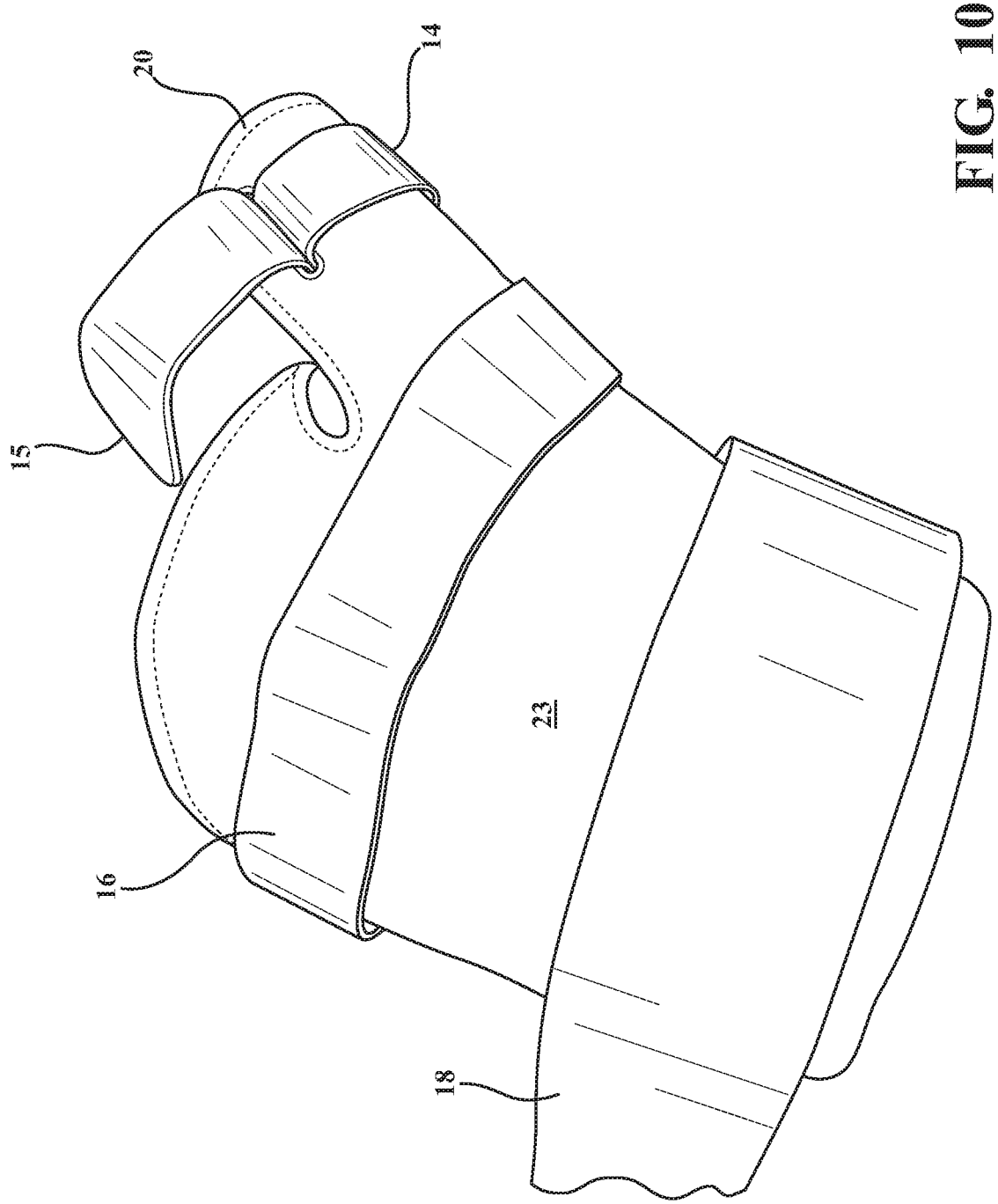
FIG. 10 is a rotated close up of the wearable device and which illustrates the plural thumb, hand and wrist attachment straps from another angle.

Proceeding to FIG. 9, an initial installation view is depicted in which the wearable device 10 is initially positioned in place with the thumb strap 14 and hook and loop portions 15 engaged, and the hand 16 and wrist 18 strap portions remaining loose prior to installation of the support tube 12. FIG. 10 is a rotated close up of the wearable device 10 and which illustrates the plural thumb 14, hand 16 and wrist 18 attachment straps from another angle.

Figure 11:
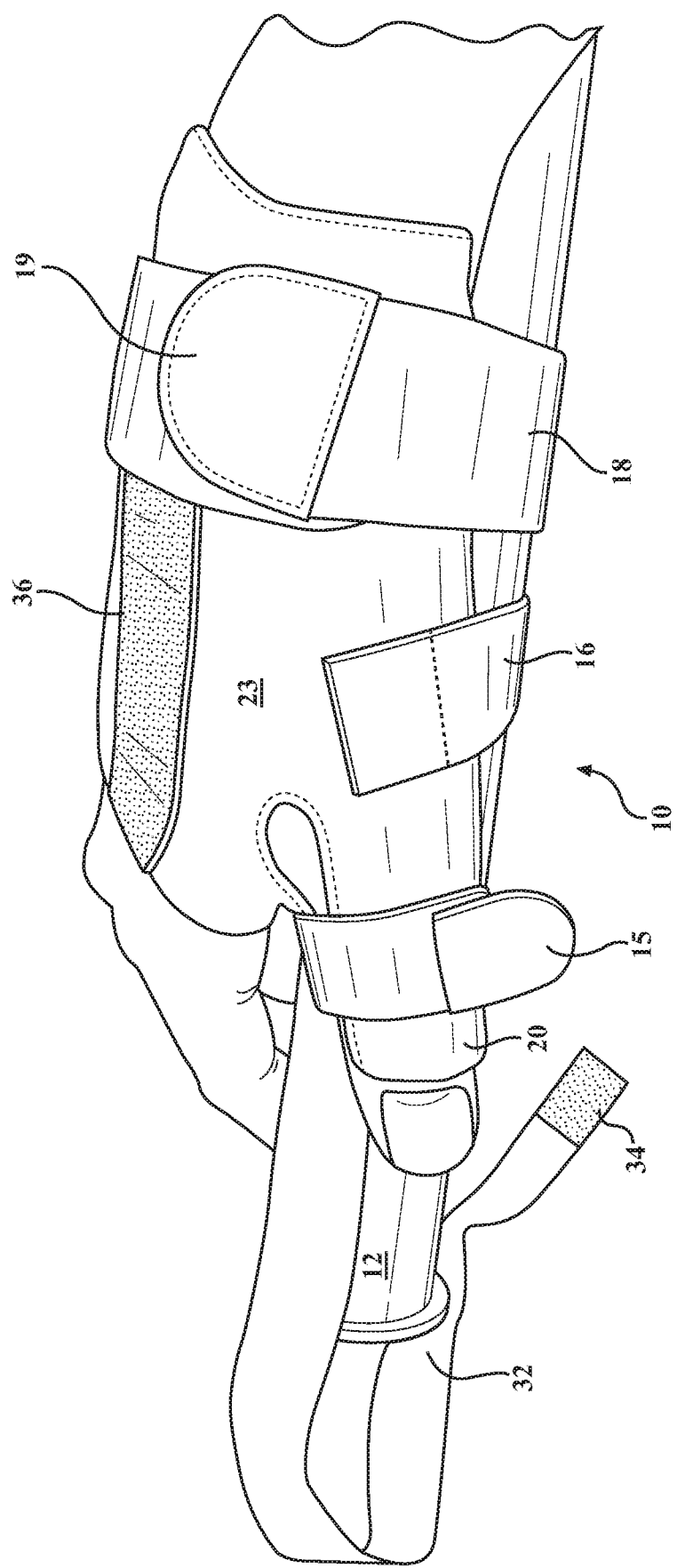
FIG. 11 is an intermediate installation view in which the tubular support is slid into place in proximity to the wearers palm underneath the hand and wrist straps, these being subsequently tightened to secure the tube in place, the retention strap of the tube (see also FIG. 8) illustrated prior to engagement with a further hook and loop engagement portion extending along a surface of the wearable attachment overlaying a back of the user's hand.

FIG. 11 is an intermediate installation view in which the tubular support 12 is slided into place in proximity to the wearers palm underneath the hand 16 and wrist 18 straps, these being subsequently tightened to secure the tube in place, the retention strap of the tube (see also FIG. 7) illustrated prior to engagement of the tube extending strap 26 at end 32 with the further hook and loop engagement portions 36 extending along the exterior surface of the wearable attachment main body 23 overlaying a back of the user's hand, these being again engaged by the end surface hook and loop portions 34 (see again FIG. 12) associated with the end of the tube strap 26.

Figure 12:
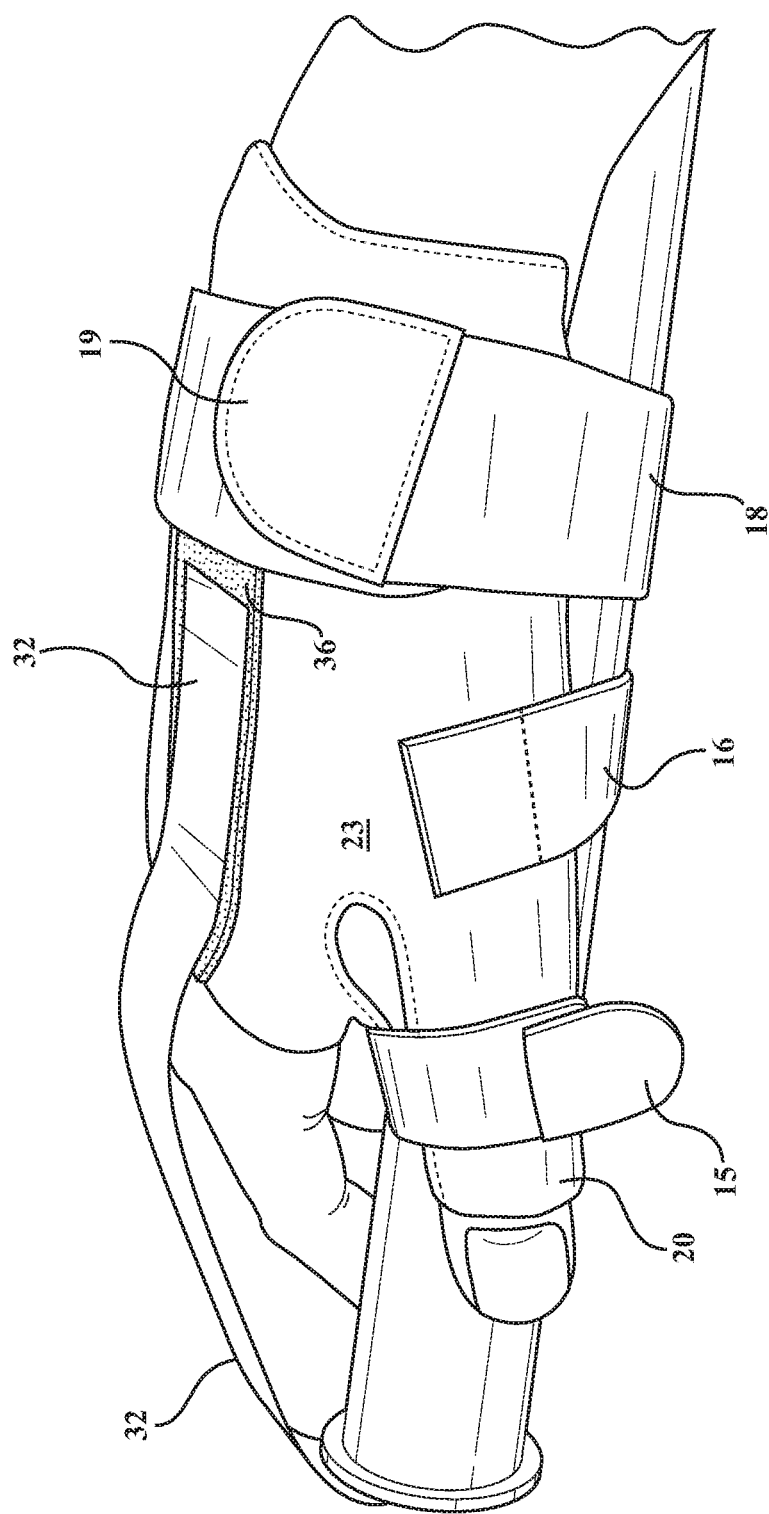
FIG. 12 is a completed assembly illustration of the wearable assist device and in which a matching hook and loop portion configured on an extending end of the tube retention strap is secured to the exterior of the wearable attachment, such providing in combination retention of the rod or shaft in seated fashion within the retention tube (see again FIGS. 1-3 and 5), along with preventing sliding forward displacement of the tube out of contact with the wearable device.

Finally, FIG. 12 is a completed assembly illustration of the wearable assist device and in which the matching hook and loop portions 34 configured on an extending end of the tube retention strap 26 are secured to the exterior of the wearable attachment, such providing in combination retention of the rod or shaft in seated fashion within the retention tube (see again FIGS. 1-3 and 5), along with preventing sliding forward displacement of the tube out of contact with the wearable device. As previously described, the strap 26 can be wound wrapped or otherwise secured about the projecting base of the rod or club 2 and which, in combination with the frictional retention aspects contributed by the tube insert 24 (again FIG. 5) compensate for limitations in the wearer's grip to retain the rod or shaft within the user's grasp during typical dynamic motions associated with the pursuit, and again not limited to any of casting a fishing rod/reel (including rearward and forward overhand motions) or, alternatively, exerting backstroke and follow through motions for a golf club which can be likewise attached/ secured in a similar fashion as the fishing rod which is illustrated and which is adequately retained in place (without sliding or twisting) without detriment to the user as a result of his/her reduced gripping capabilities.

Having described my invention, other and additional preferred embodiments will become apparent to those skilled in the art to which it pertains, and without deviating from the scope of the appended claims. This can potentially include the tube being permanently attached or otherwise secured to the wearable device in any fashion desired and not limited to the use of any of clips, anchors or other attachment portions and so that the tube does not slide or rotate in use.

I claim:

1. A combination wearable assist device, receiving tube and an elongated article supported by the assist device and tube for providing grip assistance to a wearer of limited hand and grip ability during manipulation of the elongated article by the wearer, comprising:

said device including an attachable body having each of thumb, hand and wrist strap portions adapted to being respectively secured about each of a thumb, a hand and a wrist of the wearer;

said hand and wrist straps further securing the receiving tube against an underside of the hand and wrist of the wearer;

a lanyard strap attached to said receiving tube at a first end encircling a location of the elongated article projecting from said receiving tube and following insertion of the elongated article within an open forward end of said receiving tube, a second end of said lanyard strap attaching to a back hand location of said body; and said tube receiving and resistively engaging the elongated article to compensate for the limitations in the user's hand and grip ability during a motion induced manipulation of the article.

2. The invention of claim 1, further comprising hook and loop portions configured at opposite ends of said lanyard strap and said attachable locations along said receiving tube and back hand location of said body.

3. The invention of claim 1, the body further comprising a forward projection adapted to surrounding the wearer's thumb and for supporting ends of the thumb strap portion.

4. The invention of claim 1, said attachable body further comprising a durable fabric material.

5. The invention of claim 1, said tube further comprising a rigid material not limited to a lightweight aluminum or PVC material.

6. The invention of claim 1, further comprising hook and loop portions extending from each of extending end locations of said thumb, hand and wrist straps.

7. The invention of claim 6, said body further comprising a main contoured portion incorporating a receiving slot for receiving remote attaching end of said hand strap.

8. The invention of claim 1, further comprising a biasing insert supported within an open end of said receiving tube for frictionally retaining the inserted elongated article.

9. The invention of claim 8, said biasing insert further comprising a foam semi-circular shaped portion.

\* \* \* \* \*